United States Patent
Zou

(10) Patent No.: US 12,079,444 B2
(45) Date of Patent: Sep. 3, 2024

(54) INFORMATION PROCESSING METHOD AND APPARATUS, AND ELECTRONIC DEVICE

(71) Applicant: VIVO MOBILE COMMUNICATION CO., LTD., Dongguan (CN)

(72) Inventor: Risheng Zou, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/135,875

(22) Filed: Apr. 18, 2023

(65) Prior Publication Data
US 2023/0251755 A1    Aug. 10, 2023

Related U.S. Application Data

(63) Continuation of application No. PCT/CN2021/126688, filed on Oct. 27, 2021.

(30) Foreign Application Priority Data

Oct. 29, 2020 (CN) .......................... 202011180674.6

(51) Int. Cl.
*G06F 3/048* (2013.01)
*G06F 3/04817* (2022.01)
*G06F 3/0488* (2022.01)

(52) U.S. Cl.
CPC ........ *G06F 3/04817* (2013.01); *G06F 3/0488* (2013.01)

(58) Field of Classification Search
CPC .......................... G06F 3/04817; G06F 3/0488
See application file for complete search history.

(56) References Cited

U.S. PATENT DOCUMENTS

| | | | |
|---|---|---|---|
| 9,800,711 B2* | 10/2017 | Brown | G06F 3/04847 |
| 10,203,866 B2* | 2/2019 | Karunamuni | G06F 3/04842 |
| 11,079,913 B1* | 8/2021 | Kim | H04M 1/72433 |
| 11,439,902 B2* | 9/2022 | Knoppert | A63F 13/428 |
| 11,442,749 B2* | 9/2022 | Magureanu | G06F 3/04847 |
| 2012/0004902 A1 | 1/2012 | Sorkey et al. | |
| 2013/0246913 A1* | 9/2013 | McCormack | G06F 3/04842 715/255 |
| 2015/0339052 A1* | 11/2015 | Yuan | G06F 3/04883 715/765 |
| 2016/0253049 A1* | 9/2016 | Wild | G01C 21/36 715/763 |
| 2018/0335921 A1* | 11/2018 | Karunamuni | G06F 3/04842 |
| 2018/0335939 A1* | 11/2018 | Karunamuni | G06F 3/0481 |

(Continued)

FOREIGN PATENT DOCUMENTS

| | | |
|---|---|---|
| CN | 103888608 A | 6/2014 |
| CN | 107450795 A | 12/2017 |

(Continued)

*Primary Examiner* — David Phantana-angkool
(74) *Attorney, Agent, or Firm* — The Webb Law Firm

(57) ABSTRACT

An information processing method includes displaying an input box and a status bar, where the status bar includes at least one status icon; receiving a first input on a target status icon in the status bar; and in response to the first input, displaying target information in the input box or sending the target information, where the target information includes prompt information that corresponds to a state represented by the target status icon.

15 Claims, 7 Drawing Sheets

(56) References Cited

U.S. PATENT DOCUMENTS

| | | | | |
|---|---|---|---|---|
| 2019/0320301 A1* | 10/2019 | Chang | ................... | H04W 4/14 |
| 2019/0361694 A1* | 11/2019 | Gordon | ................ | G06F 1/3231 |
| 2020/0341617 A1* | 10/2020 | Xiong | ..................... | G06F 9/451 |
| 2022/0050656 A1* | 2/2022 | Fan | ....................... | G06F 3/1454 |
| 2022/0269405 A1* | 8/2022 | Wu | ................... | H04M 1/72439 |
| 2023/0102947 A1* | 3/2023 | Logan | ..................... | H04L 67/01 |
| | | | | 715/212 |
| 2023/0188832 A1* | 6/2023 | Xu | ........................ | G06T 19/006 |
| | | | | 348/333.01 |
| 2023/0216990 A1* | 7/2023 | Fang | ..................... | H04N 7/152 |
| | | | | 348/14.09 |
| 2023/0269437 A1* | 8/2023 | Fang | ....................... | H04N 7/15 |
| | | | | 725/37 |
| 2023/0280878 A1* | 9/2023 | Ballesteros | ............ | G06V 40/10 |
| | | | | 715/773 |
| 2023/0282000 A1* | 9/2023 | Pang | ..................... | G01S 13/726 |
| | | | | 382/103 |
| 2023/0308538 A1* | 9/2023 | Caro | ................ | H04W 52/0267 |

FOREIGN PATENT DOCUMENTS

| | | | |
|---|---|---|---|
| CN | 108595074 | A | 9/2018 |
| CN | 110753153 | A | 2/2020 |
| CN | 110888707 | A | 3/2020 |
| CN | 112269510 | A | 1/2021 |
| EP | 2806619 | A2 | 11/2014 |
| JP | 2008098744 | A | 4/2008 |
| JP | 2010050996 | A | 3/2010 |

* cited by examiner

INFORMATION PROCESSING METHOD AND APPARATUS, AND ELECTRONIC DEVICE

CROSS-REFERENCE TO RELATED APPLICATIONS

This application is a Bypass Continuation Application of PCT/CN2021/126688 filed Oct. 27, 2021, and claims priority to Chinese Patent Application No. 202011180674.6 filed Oct. 29, 2020, the disclosures of which are hereby incorporated herein by reference in their entireties.

BACKGROUND OF THE INVENTION

Field of the Invention

This application belongs to the field of communication technologies, and in particular, to an information processing method and an apparatus as well as an electronic device.

Description of Related Art

With the popularity of electronic devices, functions of an electronic device become increasingly consummate. Currently, a user may use a chat function of an electronic device to chat or communicate with a chat object. When chatting with the chat object by using a chat interface, the user needs to enter text information manually, and send the text information as a message to the chat object. However, when status information of an electronic device needs to be sent to one or more chat objects, text information needs to be entered manually for each chat object, resulting in a complex message sending operation.

SUMMARY OF THE INVENTION

Embodiments of this application provide an information processing method and an apparatus as well as an electronic device.

According to a first aspect, an embodiment of this application provides an information processing method. The method includes:
  displaying an input box and a status bar, where the status bar includes at least one status icon;
  receiving a first input on a target status icon in the status bar; and
  in response to the first input, displaying target information in the input box or sending the target information, where
  the target information includes prompt information that corresponds to a state represented by the target status icon.

According to a second aspect, an embodiment of this application provides an information processing apparatus. The apparatus includes:
  a first display module, configured to display an input box and a status bar, where the status bar includes at least one status icon;
  a first receiving module, configured to receive a first input on a target status icon in the status bar; and
  a processing module, configured to: in response to the first input, display target information in the input box or send the target information, where
  the target information includes prompt information that corresponds to a state represented by the target status icon.

According to a third aspect, an embodiment of this application provides an electronic device. The electronic device includes a processor, a memory, and a program or instructions stored in the memory and executable on the processor. When the program or the instructions are executed on the processor, steps of the information processing method according to the first aspect are implemented.

According to a fourth aspect, an embodiment of this application provides a non-transitory readable storage medium. The non-transitory readable storage medium stores a program or instructions. When the program or the instructions are executed on a processor, steps of the information processing method according to the first aspect are implemented.

According to a fifth aspect, an embodiment of this application provides a chip. The chip includes a processor and a communication interface. The communication interface is coupled to the processor. The processor is configured to run a program or instructions to implement the method according to the first aspect.

According to a sixth aspect, a computer program product is provided. The computer program product is stored in a non-transitory storage medium. The computer program product is executed on at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art fall within the protection scope of this application.

Terms "first" and "second" in the specification and claims of this application are used to distinguish between similar objects instead of describing a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specification and claims, "and/or" represents at least one of connected objects, and a character "I" generally represents an "or" relationship between associated objects.

With reference to the accompanying drawings, the information processing method provided in the embodiments of this application is described in detail by using some embodiments and application scenarios.

Figure 1:
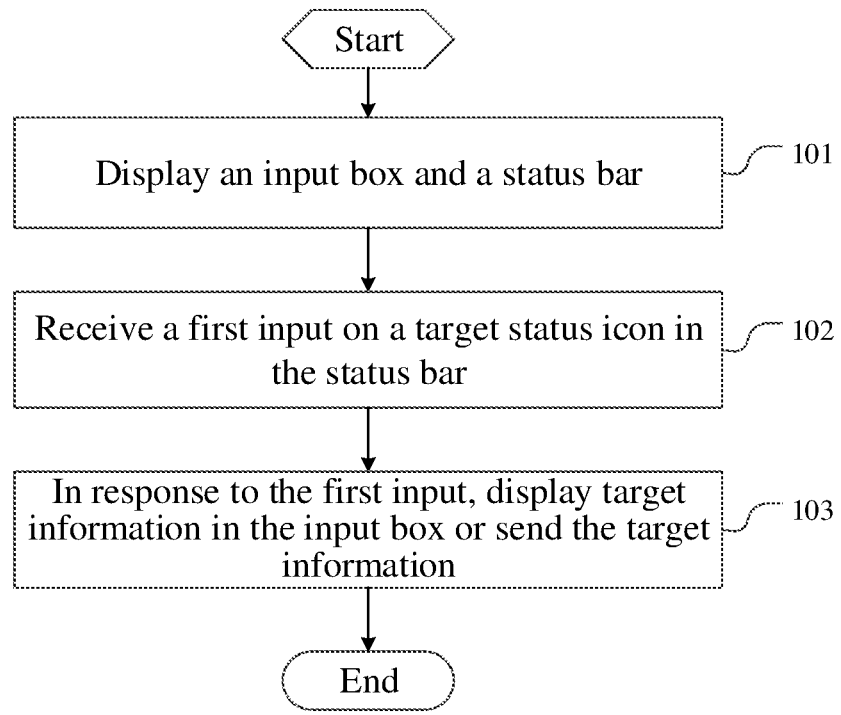
FIG. 1 is a flowchart of an information processing method according to an embodiment of this application.

FIG. 1 is a flowchart of an information processing method according to an embodiment of this application. As shown in FIG. 1, the method includes the following steps:

Step 101: Display an input box and a status bar, where the status bar includes at least one status icon.

The input box and the status bar may be displayed in a desktop of an electronic device. The at least one status icon may include a battery level status icon, a signal strength status icon, a network status icon, a time status icon, or the like. This is not limited in this embodiment. The battery level status icon may be used to represent a battery level status. The signal strength status icon may be used to represent a signal strength. The network status icon may be used to represent a network status. The time status icon may be used to represent a current time. For example, the at least one status icon may be a status icon in the status bar of the electronic device. For example, the electronic device is a mobile phone. In this case, the at least one status icon may be a status icon displayed at the top end of a desktop of the mobile phone. For example, the at least one status icon may include the battery level status icon that is used to represent the battery level status.

Step 102: Receive a first input on a target status icon in the status bar.

The target status icon may be a status icon in the at least one status icon. The first input may be an operation of tapping the target status icon, an operation of long pressing a cursor until the cursor is moved to the target status icon, an operation of swiping on the target status icon, or the like. This is not limited in this embodiment.

Step 103: In response to the first input, display target information in the input box or send the target information.

The target information includes prompt information that corresponds to a state represented by the target status icon.

The target information may include text prompt information, where the text prompt information is used to prompt the state represented by the target status icon; or the target information may include the target status icon; or the target information may include both the text prompt information and the target status icon. Optionally, the target information may further carry a prompt statement, where the prompt statement is used to indicate that the target information is built-in information of the electronic device. For example, the target status icon is the signal strength status icon. In this case, the target information may be "The current signal of the electronic device is weak."

In addition, the input box may be an input box in a chat interface. After the target information is displayed in the input box, an editing operation is allowed to be performed on the input box. After the target information in the input box is modified, modified information is sent to a chat object. Therefore, a user can further edit the input box and modify information in the input box, bringing high flexibility and good user experience. Alternatively, the target information is sent directly, thereby further improving a message sending speed.

During actual application, when the electronic device is in a state of low battery level, poor communication signal quality, or the like, the user may fail to continue chatting with the chat object. In a case, to inform the chat object about the state of the electronic device, the user needs to enter text and send the text to the chat object, which is a complex operation. In this embodiment of this application, prompt information that corresponds to a state represented by a status icon is obtained and sent automatically by performing an operation on the status icon, instead of manually entering text information. Therefore, a message sending speed is high; thought is not required; the operation is convenient and fast; it costs the user less to reply a message with high message reply efficiency, and brings great enjoyment; and user experience is good.

Figure 2:
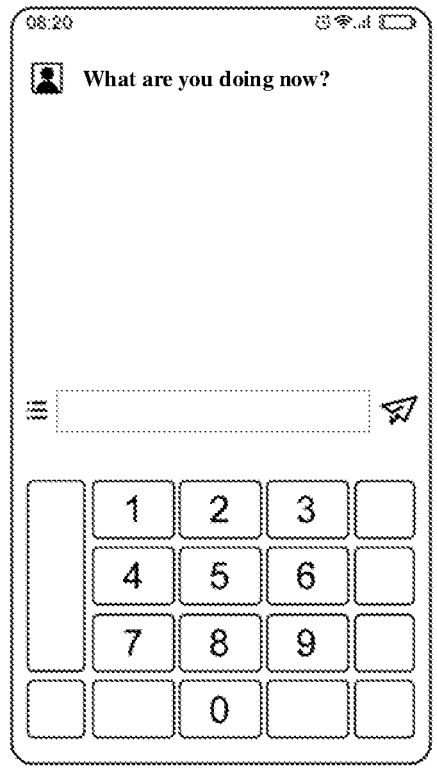
FIG. 2 is a first schematic diagram of an interface display of an electronic device according to an embodiment of this application.
Figure 3:
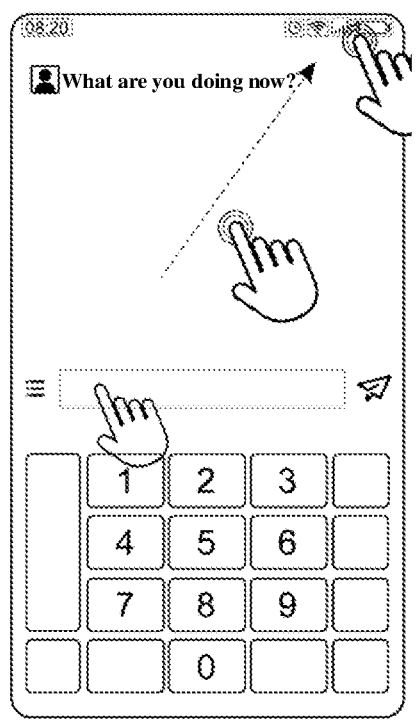
FIG. 3 is a second schematic diagram of an interface display of an electronic device according to an embodiment of this application.
Figure 4:
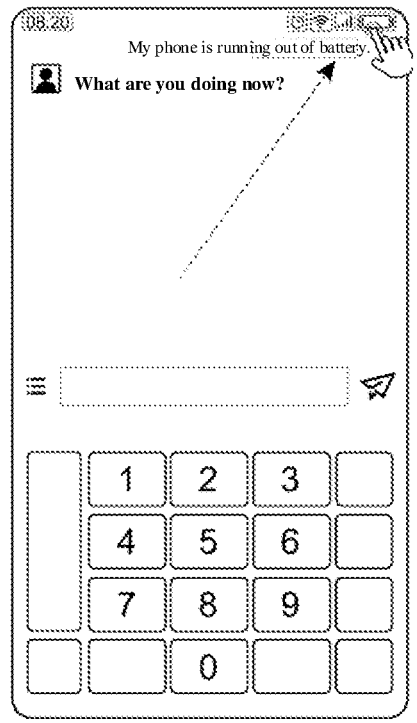
FIG. 4 is a third schematic diagram of an interface display of an electronic device according to an embodiment of this application.
Figure 5:
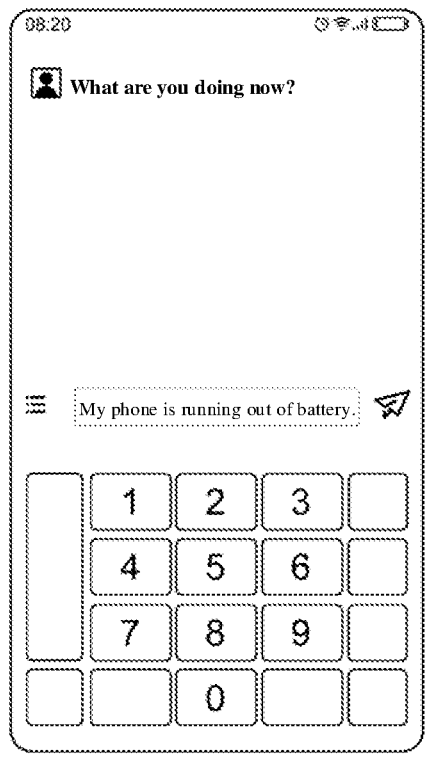
FIG. 5 is a fourth schematic diagram of an interface display of an electronic device according to an embodiment of this application.
Figure 6:
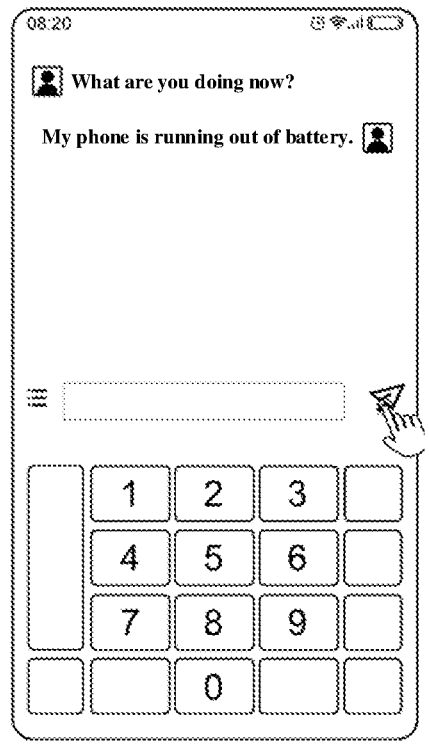
FIG. 6 is a fifth schematic diagram of an interface display of an electronic device according to an embodiment of this application.
Figure 7:
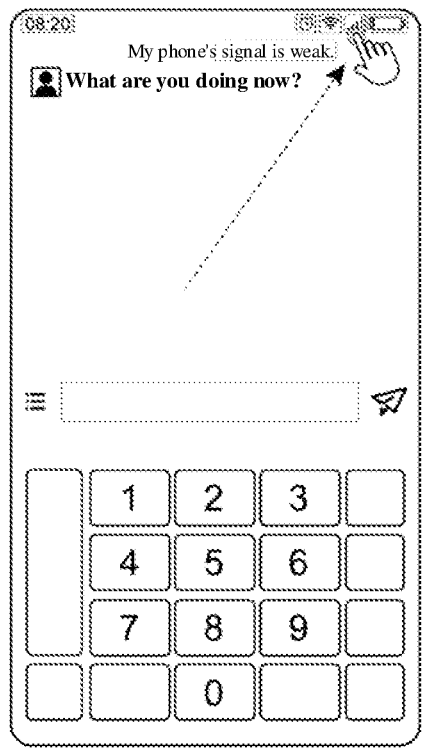
FIG. 7 is a sixth schematic diagram of an interface display of an electronic device according to an embodiment of this application.
Figure 8:
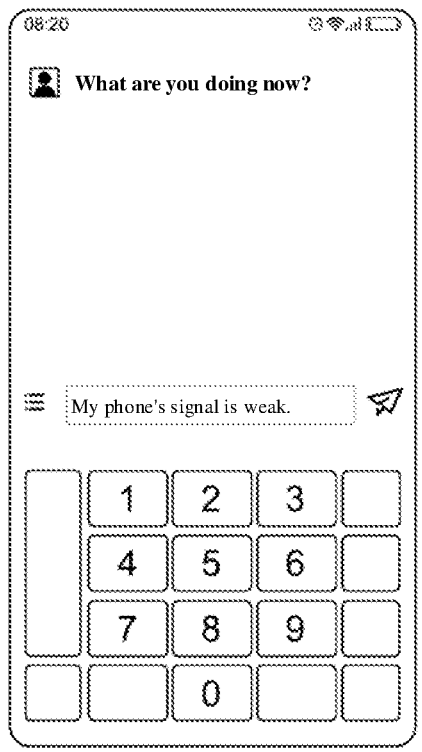
FIG. 8 is a seventh schematic diagram of an interface display of an electronic device according to an embodiment of this application.
Figure 9:
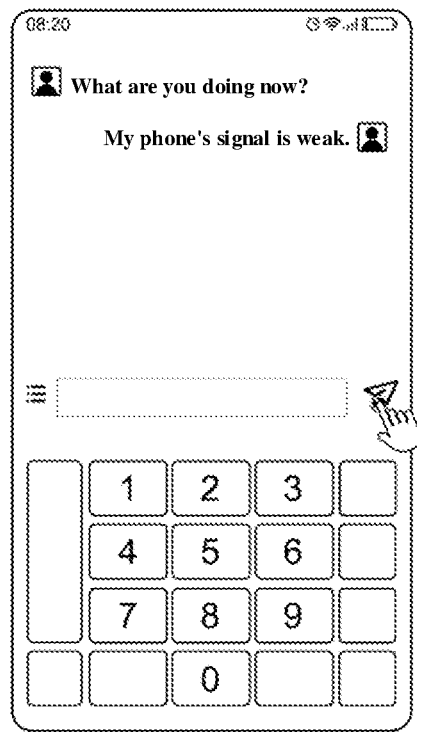
FIG. 9 is an eighth schematic diagram of an interface display of an electronic device according to an embodiment of this application.

For example, the electronic device is a mobile phone. In this case, the user chats with the chat object by using the mobile phone. As shown in FIG. 2, the chat object sends a message "What are you doing now?" In a case that the mobile phone is of a low battery level, and the input box of the chat interface is in an editable state, as shown in FIG. 3, after the user long presses the input box, status icons in the status bar of the mobile phone are framed, and each status icon in the status bar is highlighted. This can guide the user to view attribute information corresponding to each status icon in the status bar. The user long presses the input box and moves the input box to the status bar. As shown in FIG. 4, prompt information "My phone is running out of battery" that corresponds to a state represented by the battery level status icon is displayed if the user moves the cursor to the battery level status icon. As shown in FIG. 5, the user selects the prompt information to display the prompt information in the input box. As shown in FIG. 6, the user taps a sending control to send the prompt information to the chat object. As shown in FIG. 7, prompt information "My phone's signal is weak" that corresponds to a state represented by the signal strength status icon is displayed if the user moves the cursor to the signal strength status icon. As shown in FIG. 8, the user selects the prompt information to display the prompt information in the input box. As shown in FIG. 9, the user taps a sending control to send the prompt information to the chat object.

In the embodiments of this application, an input box and a status bar are displayed, where the status bar includes at least one status icon; a first input on a target status icon in the status bar is received; and in response to the first input, target information is displayed in the input box, or the target information is sent, where the target information includes prompt information that corresponds to a state represented by the target status icon. In this way, when status information of an electronic device needs to be sent to one or more chat objects, prompt information that corresponds to a state represented by a status icon can be obtained and sent automatically by performing an operation on the status icon, instead of manually entering text information. Therefore, message sending complexity can be decreased.

Optionally, the target information includes text prompt information and/or the target status icon, where the text prompt information is used to prompt the state represented by the target status icon.

Figure 10:
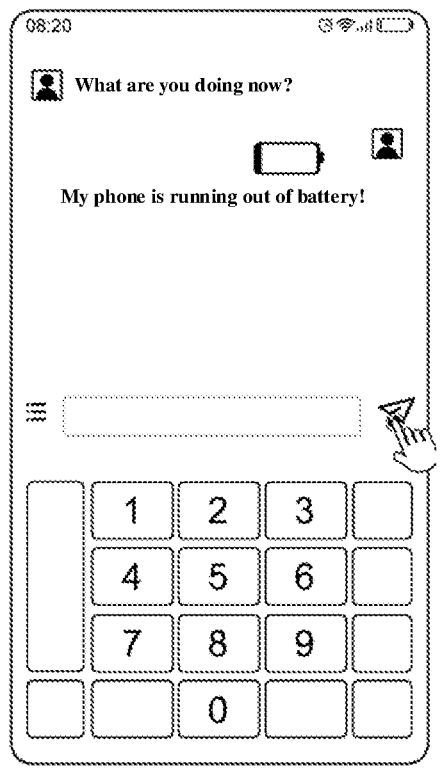
FIG. 10 is a ninth schematic diagram of an interface display of an electronic device according to an embodiment of this application.
Figure 11:
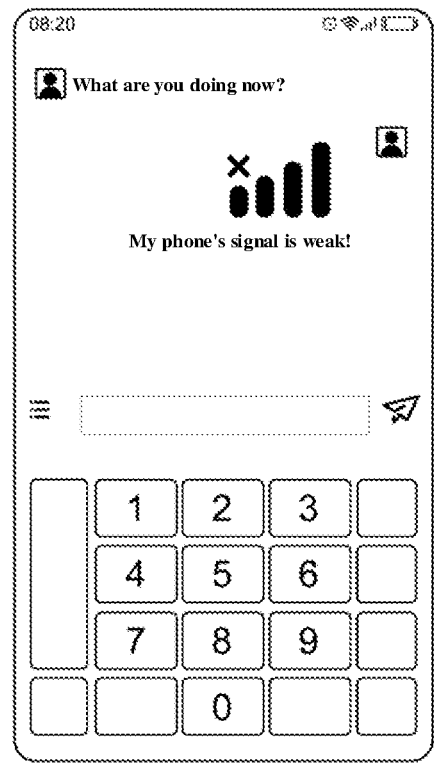
FIG. 11 is a tenth schematic diagram of an interface display of an electronic device according to an embodiment of this application.

The text prompt information may be built-in prompt information of the electronic device, or may be prompt information set by the user. For example, the target status icon is the signal strength status icon. In this case, the text prompt information may be "My phone's signal is weak." The target information may include the text prompt information and the target status icon. For example, a prompt picture may be generated based on the text prompt information and the target status icon. The prompt picture includes the text prompt information and the target status icon. The target information may include the prompt picture. For example, the target status icon is the battery level status icon. As shown in FIG. 10, the target information may be a prompt picture that includes the battery level status icon and text prompt information "My phone is running out of battery." For example, the target status icon is the signal strength status icon. As shown in FIG. 11, the target information may be a prompt picture that includes the signal strength status icon and text prompt information "My phone's signal is weak."

In this implementation, the text prompt information and/or the target status icon are/is obtained and sent automatically by performing an operation on a status icon. This can not only reduce time spent by the user in chatting, but also conveniently, fast, and accurately inform the chat object about a state of the electronic device of the user.

Optionally, displaying the target information in the input box or sending the target information includes:
  displaying at least one piece of prompt information that corresponds to the state represented by the target status icon;
  receiving a second input for selecting target prompt information from the at least one piece of prompt information; and
  in response to the second input, displaying the target information in the input box or sending the target information, where the target information includes target prompt information.

In addition, the at least one piece of prompt information may be built-in prompt information of the electronic device, or may be prompt information set by the user, or may include the built-in prompt information of the electronic device and the prompt information set by the user. For example, if the user has not set any prompt information, the built-in prompt information of the electronic device is displayed; or if the user has preset prompt information, the prompt information set by the user is displayed. Prompt information for different status icons may be different. For example, prompt information corresponding to the battery level status icon may be "My phone is running out of battery. Hurry up."

Optionally, the second input may be an operation of tapping the target prompt information, an operation of long pressing a cursor until the cursor is moved to the target prompt information, an operation of swiping on the target prompt information, or the like. This is not limited in this embodiment.

For example, when the user moves a cursor to the target status icon while keeping the cursor long pressed, at least one piece of prompt information that corresponds to the state represented by the target status icon may be displayed in a translucent and floating manner. If the user moves the cursor from the target status icon to another status icon while keeping the cursor long pressed, at least one piece of prompt information that corresponds to a state represented by another status icon is displayed in the translucent and floating manner, and displaying, in the translucent and floating manner, of the at least one piece of prompt information that corresponds to the state represented by the target status icon is canceled. If the user stops pressing the cursor after the cursor is moved to the target status icon, the at least one piece of prompt information that corresponds to the state represented by the target status icon is displayed in a fixed manner.

In this implementation, the at least one piece of prompt information that corresponds to the state represented by the target status icon is displayed, so that the user can select the target prompt information from the at least one piece of prompt information. Therefore, the user can select the target prompt information that conforms to his/her own requirement. The method may be applicable to various application scenarios, has high flexibility, and leads to good user experience.

Optionally, displaying the target information in the input box or sending the target information in response to the first input includes: determining, in response to the first input, a status value that corresponds to the state represented by the target status icon; determining a target preset condition met by the status value; and displaying the target information in the input box or sending the target information.

Optionally, displaying the at least one piece of prompt information that corresponds to the state represented by the target status icon includes:
  determining a status value that corresponds to the state represented by the target status icon;
  determining a target preset condition met by the status value; and
  displaying the at least one piece of prompt information that corresponds to the target preset condition.

If the target status icon is the battery level status icon, the status value may be a battery level value. If the target status icon is the signal strength status icon, the status value may be a signal strength value. If the target status icon is the time status icon, the status value may be a time value.

In addition, if the status value that corresponds to the state represented by the target status icon meets different preset conditions, the at least one piece of prompt information that corresponds to the state represented by the target status icon may be different. The at least one piece of prompt information may correspond to the preset condition met by the status value. For example, the target status icon is the battery level status icon. A first preset condition may be that the battery level value is greater than a first preset value; and at least one piece of prompt information corresponding to the first preset condition may include: "The current battery level value is high." A second preset condition may be that the battery level value is less than a second preset value; and at least one piece of prompt information corresponding to the second preset condition may include: "The current battery level value is low." The first preset value is greater than the second preset value.

For example, the target status icon is the battery level status icon. If a battery level value of the electronic device is greater than 80%, the at least one piece of prompt information may include: "The current battery level value is high." If the battery level value of the electronic device is less than 20%, the at least one piece of prompt information may include: "The current battery level value is low."

In this implementation, different pieces of prompt information are displayed for different status values, so that a state of the electronic device can be described more accurately, and the chat object can be accurately informed about a current state of the electronic device.

Optionally, before receiving the first input on the target status icon in the status bar, the method further includes:
receiving a third input; and
updating a display state of the at least one status icon from a first state to a second state in response to the third input.

The third input may be an operation of long pressing the input box, an operation of swiping on a chat interface according to a preset gesture, an operation of single-tapping a preset control on the chat interface, and the like. This is not limited in this embodiment.

In addition, the second state is a state different from the first state. For example, the first state may be a conventional display state; and the second state may be a state in which highlighting is performed on the basis of the first state; or the second state may be a state in which highlighting in red is performed on the basis of the first state; or the second state may be a state in which amplification is performed on the basis of the first state. This is not limited in this embodiment. Updating the display state of the at least one status icon from the first state to the second state may be used to highlight the at least one status icon, and reduce visibility of information other than the at least one status icon, thereby guiding the user to focus on the at least one status icon.

In this implementation, the display state of the at least one status icon is updated from the first state to the second state. This can guide the user to select the target status icon from the at least one status icon, brings great enjoyment, and has a good effect in interacting with the user.

Optionally, before receiving the first input on the target status icon in the status bar, the method further includes:
receiving a fourth input; and
in response to the fourth input, displaying attribute information corresponding to each status icon in the at least one status icon at a position corresponding to the status icon, and updating a display state of a region outside the status bar from a third state to a fourth state, where the attribute information is used to describe a state represented by the status icon.

The fourth input may be an operation of long pressing the input box, an operation of swiping on a chat interface according to a preset gesture, an operation of single-tapping a preset control on the chat interface, and the like. This is not limited in this embodiment. The position corresponding to the status icon may be under the status icon, at an upper right corner of the status icon, at an upper left corner of the status icon, or the like. This is not limited in this embodiment.

For example, when the status icon is the battery level status icon, the attribute information corresponding to the status icon may be "battery level" or "battery level value xx"; when the status icon is the signal strength status icon, the attribute information corresponding to the status icon may be "signal strength" or "signal strength value yy"; when the status icon is the time status icon, the attribute information corresponding to the status icon may be "time" or "time zz"; and when the status icon is the network status icon, the attribute information corresponding to the status icon may be "network state" or "WIFI/Not WIFI". During actual application, the attribute information may be displayed in a translucent form, or a circularly framed form, or a translucent and circularly framed form. For example, when the cursor is moved to the battery level status icon, the following is displayed: battery level value 50%.

In addition, the fourth state is a state different from the third state. For example, the third state may be a conventional display state; and the fourth state may be a state in which a mask is added on the basis of the third state; or the fourth state may be a state in which dimming is performed on the basis of the third state; or the fourth state may be a state in which incomplete transparentizing is performed on the basis of the third state. This is not limited in this embodiment. Updating the display state of the region outside the status bar from the third state to the fourth state may be used to highlight the status bar, and reduce visibility of the region outside the status bar, thereby guiding the user to focus on a status icon displayed in the status bar.

It should be noted that, when an operation performed in the region outside the status bar is received, displaying of the attribute information corresponding to each status icon in the at least one status icon at the position corresponding to the status icon may be canceled, and the display state of the region outside the status bar may be updated from the fourth state to the third state.

In this implementation, the attribute information corresponding to each status icon in the at least one status icon is displayed at the position corresponding to the status icon, and the display state of the region outside the status bar is updated from the third state to the fourth state. This can guide the user to select the target status icon from the status bar, brings great enjoyment, and has a good effect in interacting with the user.

It should be noted that the information processing method provided in the embodiments of this application may be performed by an information processing apparatus, or a control module that is in the information processing apparatus and that is configured to perform and load the information processing method. In the embodiments of this application, that the information processing apparatus performs and loads the information processing method is used as an example to describe the information processing apparatus provided in the embodiments of this application.

Figure 12:
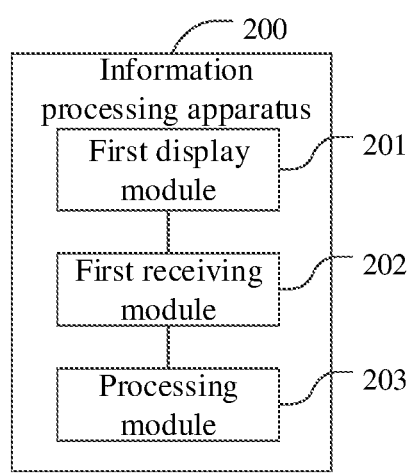
FIG. 12 is a schematic diagram of a structure of an information processing apparatus according to an embodiment of this application.

FIG. 12 is a schematic diagram of a structure of an information processing apparatus according to an embodiment of this application. As shown in FIG. 12, the apparatus 200 includes:
a first display module 201, configured to display an input box and a status bar, where the status bar includes at least one status icon;
a first receiving module 202, configured to receive a first input on a target status icon in the status bar; and
a processing module 203, configured to: in response to the first input, display target information in the input box or send the target information, where
the target information includes prompt information that corresponds to a state represented by the target status icon.

In this embodiment of this application, a first display module displays an input box and a status bar, where the status bar includes at least one status icon; a first receiving module receives a first input on a target status icon in the status bar; and in response to the first input, a processing module displays target information in the input box or sends the target information, where the target information includes prompt information that corresponds to a state represented by the target status icon. In this way, when status information of an electronic device needs to be sent to one or more chat objects, prompt information that corresponds to a state represented by a status icon can be obtained and sent automatically by performing an operation on the status icon, instead of manually entering text information. Therefore, message sending complexity can be decreased.

Optionally, the target information includes text prompt information and/or the target status icon, where the text prompt information is used to prompt the state represented by the target status icon.

Optionally, the processing module 203 includes:
a display unit, configured to display at least one piece of prompt information that corresponds to the state represented by the target status icon;
a receiving unit, configured to receive a second input for selecting target prompt information from the at least one piece of prompt information; and
a processing unit, configured to: in response to the second input, display the target information in the input box or send the target information, where the target information includes target prompt information.

Optionally, the display unit is configured to:
determine a status value that corresponds to the state represented by the target status icon;
determine a status value that corresponds to the state represented by the target status determine a target preset condition met by the status value; and
display the at least one piece of prompt information that corresponds to the target preset condition.

Optionally, the apparatus 200 further includes:
a second receiving module, configured to receive a third input; and
a first update module, configured to update a display state of the at least one status icon from a first state to a second state in response to the third input.

Optionally, the apparatus 200 further includes:
a third receiving module, configured to receive a fourth input; and
a second update module, configured to: in response to the fourth input, display attribute information corresponding to each status icon in the at least one status icon at a position corresponding to the status icon, and update a display state of a region outside the status bar from a third state to a fourth state, where the attribute information is used to describe a state represented by the status icon.

The information processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The information processing apparatus in this embodiment of this application may be an apparatus with an operating system. The operating system may be an Android operating system, an iOS operating system, or another possible operating system, which is not specifically limited in the embodiments of this application.

The information processing apparatus provided in this embodiment of this application can implement the processes that are implemented in the foregoing method embodiments. To avoid repetition, details are not described herein again.

Figure 13:
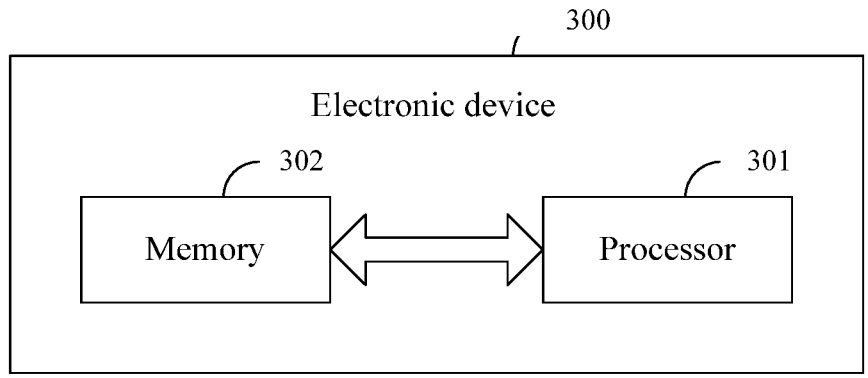
FIG. 13 is a first schematic diagram of a structure of an electronic device according to an embodiment of this application.

As shown in FIG. 13, an embodiment of this application further provides an electronic device 300, including a processor 301, a memory 302, and a program or instructions stored in the memory 302 and executable on the processor 301. When the program or instructions are executed on the processor 301, the processes of the foregoing embodiments of the information processing method are implemented, with the same technical effects achieved. To avoid repetition, details are not described herein again.

It should be noted that the electronic device in this embodiment of this application includes the mobile electronic device and the non-mobile electronic device that are described above.

Figure 14:
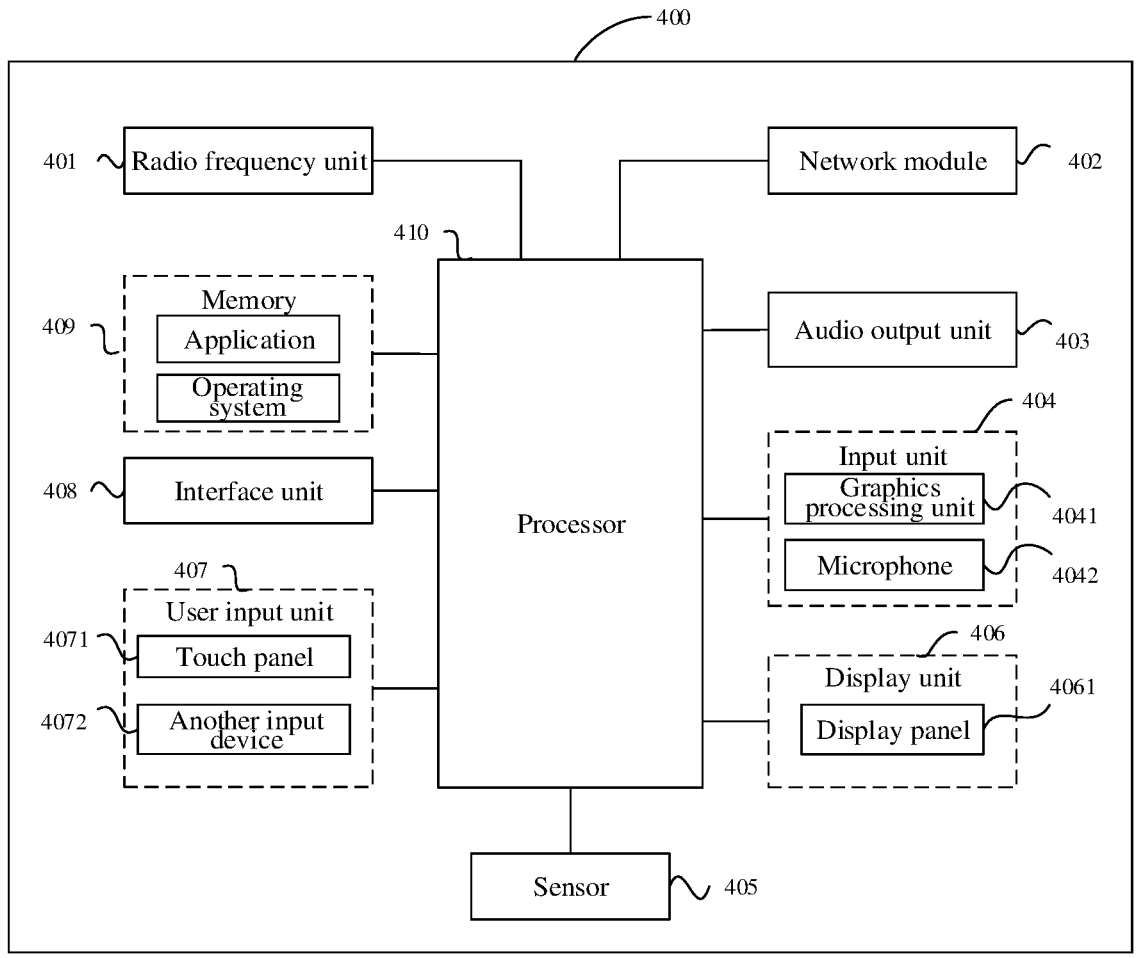
FIG. 14 is a second schematic diagram of a structure of an electronic device according to an embodiment of this application.

FIG. 14 is a schematic diagram of a hardware structure of an electronic device for implementing embodiments of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. The structure of the electronic device shown in FIG. 14 does not constitute a limitation on the electronic device. The electronic device may include components more or fewer than those shown in the figure, or some components may be combined, or there may be a different component arrangement. Details are not described herein.

The display unit 406 is configured to display an input box and a status bar, where the status bar includes at least one status icon.

The user input unit 407 is configured to receive a first input on a target status icon in the status bar.

The processor 410 is configured to: in response to the first input, display target information in the input box or send the target information.

The target information includes prompt information that corresponds to a state represented by the target status icon.

In this embodiment of this application, the display unit 406 displays an input box and a status bar, where the status bar includes at least one status icon; the user input unit 407 receives a first input on a target status icon in the status bar; and in response to the first input, the processor 410 displays target information in the input box or sends the target information, where the target information includes prompt information that corresponds to a state represented by the target status icon. In this way, when status information of an electronic device needs to be sent to one or more chat objects, prompt information that corresponds to a state represented by a status icon can be obtained and sent automatically by performing an operation on the status icon, instead of manually entering text information. Therefore, message sending complexity can be decreased.

Optionally, the target information includes text prompt information and/or the target status icon, where the text prompt information is used to prompt the state represented by the target status icon.

Optionally, the display unit 406 is further configured to display at least one piece of prompt information that corresponds to the state represented by the target status icon;

the user input unit 407 is further configured to receive a second input for selecting target prompt information from the at least one piece of prompt information; and the processor 410 is further configured to: in response to the second input, display the target information in the input box or send the target information, where the target information includes the target prompt information.

Optionally, the processor 410 is further configured to determine a status value that corresponds to the state represented by the target status icon;

the processor 410 is further configured to determine a target preset condition met by the status value; and the display unit 406 is further configured to display the at least one piece of prompt information that corresponds to the target preset condition.

Optionally, the user input unit 407 is further configured to receive a third input.

The processor 410 is further configured to update a display state of the at least one status icon from a first state to a second state in response to the third input.

Optionally, the user input unit 407 is further configured to receive a fourth input.

The processor 410 is further configured to: in response to the fourth input, display attribute information corresponding to each status icon in the at least one status icon at a position corresponding to the status icon, and update a display state of a region outside the status bar from a third state to a fourth state, where the attribute information is used to describe a state represented by the status icon.

It should be understood that, in this embodiment of this application, the input unit 404 may include a graphics processing unit (GPU) 4041 and a microphone 4042; and the graphics processing unit 4041 processes image data of a still picture or video obtained by an image capture apparatus (such as a camera) in a video capture mode or an image capture mode. The display unit 406 may include a display panel 4061. The display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. Another input device 4072 may include but is not limited to a physical keyboard, a functional button (such as a volume control button or a power on/off button), a trackball, a mouse, and a joystick. Details are not described herein. The memory 409 may be configured to store a software program and various data, including but not limited to an application program and an operating system. The processor 410 may be integrated with an application processor and a modem processor. The application processor mainly processes an operating system, a user interface, an application program, and the like. The modem processor mainly processes wireless communication. It can be understood that, alternatively, the modem processor may not be integrated into the processor 410.

An embodiment of this application further provides a non-transitory readable storage medium. The non-transitory readable storage medium stores a program or instructions. When the program or instructions are executed on a processor, the processes of the foregoing embodiments of the information processing method are implemented, with the same technical effects achieved. To avoid repetition, details are not described herein again.

The processor is a processor in the electronic device in the foregoing embodiment. The readable storage medium includes a computer-readable storage medium such as a computer read-only memory (ROM), a random access memory (RAM), a magnetic disk, an optical disc, or the like.

An embodiment of this application further provides a chip. The chip includes a processor and a communication interface. The communication interface is coupled to the processor. The processor is configured to run a program or instructions to implement the processes of the foregoing embodiments of the information processing method, with the same technical effects achieved. To avoid repetition, details are not described herein again.

It should be understood that the chip mentioned in this embodiment of this application may also be referred to as a system-level chip, a system chip, a chip system, or a system-on-a-chip.

It should be noted that, in this specification, the terms "include", "comprise", or any of their variants are intended to cover a non-exclusive inclusion, so that a process, a method, an article, or an apparatus that includes a series of elements includes not only those elements but also other elements that are not expressly listed, or further includes elements inherent to such a process, method, article, or apparatus. In the absence of more restrictions, an element defined by a phrase "including a . . . " does not preclude the existence of other identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the foregoing descriptions of the implementations, a person skilled in the art may clearly understand that the method in the foregoing embodiments may be implemented by using software in addition to a necessary universal hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the method described in the embodiments of this application.

A person of ordinary skill in the art may be aware that, in combination with the examples described in the embodiments disclosed in this specification, units and algorithm steps may be implemented by using electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the above described system, apparatus, and unit, reference may be made to a corresponding process in the above method embodiments. Details are not described herein again.

In the embodiments provided in this application, it should be understood that the disclosed apparatus and method may be implemented in another manner. For example, the apparatus embodiments described above are only an example. For example, the division of the units is only logical function division. There may be other division manners in actual implementation, for example, multiple units or components may be combined or integrated into another system, or some features may be ignored or not implemented. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate; and parts displayed as units may or may not be physical units, may be located in one place, or may be distributed on a plurality of network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

The embodiments of this application are described above with reference to the accompanying drawings, but this application is not limited to the foregoing specific implementations. The foregoing specific implementations are merely illustrative instead of restrictive. Under the enlightenment of this application, a person of ordinary skill in the art may make many forms without departing from the essence of this application and the protection scope of claims, all of which fall within the protection of this application.

What is claimed is:

1. An information processing method, wherein the method comprises:
    displaying an input box and a status bar, wherein the status bar comprises at least one status icon;
    receiving a first input on a target status icon in the status bar; and
    in response to the first input, displaying target information in the input box or sending the target information, wherein
    the target information comprises prompt information that corresponds to a state represented by the target status icon; and the first input comprises an operation of long pressing the input box until a cursor is moved to the target status icon; wherein the target information comprises text prompt information and/or the target status icon, and the text prompt information is used to prompt the state represented by the target status icon, wherein the state is associated with an electronic device.

2. The method according to claim 1, wherein displaying the target information in the input box or sending the target information comprises:
    displaying at least one piece of prompt information that corresponds to the state represented by the target status icon;
    receiving a second input for selecting target prompt information from the at least one piece of prompt information; and
    in response to the second input, displaying the target information in the input box or sending the target information, wherein the target information comprises the target prompt information.

3. The method according to claim 2, wherein displaying the at least one piece of prompt information that corresponds to the state represented by the target status icon comprises:
    determining a status value that corresponds to the state represented by the target status icon;
    determining a target preset condition met by the status value; and
    displaying the at least one piece of prompt information that corresponds to the target preset condition.

4. The method according to claim 1, wherein before receiving the first input on the target status icon in the status bar, the method further comprises:
    receiving a third input; and
    updating a display state of the at least one status icon from a first state to a second state in response to the third input.

5. The method according to claim 1, wherein before receiving the first input on the target status icon in the status bar, the method further comprises:
    receiving a fourth input; and
    in response to the fourth input, displaying attribute information corresponding to each status icon in the at least one status icon at a position corresponding to the status icon, and updating a display state of a region outside the status bar from a third state to a fourth state, wherein the attribute information is used to describe a state represented by the status icon.

6. An electronic device, comprising a processor, a memory, and a program or instructions stored in the memory and executable on the processor, wherein the program or the instructions, when executed on the processor, cause the electronic device to perform:
    displaying an input box and a status bar, wherein the status bar comprises at least one status icon;
    receiving a first input on a target status icon in the status bar; and
    in response to the first input, displaying target information in the input box or sending the target information, wherein
    the target information comprises prompt information that corresponds to a state represented by the target status icon; and
    the first input comprises an operation of long pressing the input box until a cursor is moved to the target status icon; wherein
    the target information comprises text prompt information and/or the target status icon, and the text prompt information is used to prompt the state represented by the target status icon, wherein the state is associated with an electronic device.

7. The electronic device according to claim 6, wherein the program or the instructions, when executed on the processor, cause the electronic device to perform:

displaying at least one piece of prompt information that corresponds to the state represented by the target status icon;

receiving a second input for selecting target prompt information from the at least one piece of prompt information; and in response to the second input, displaying the target information in the input box or sending the target information, wherein the target information comprises the target prompt information.

8. The electronic device according to claim 7, wherein the program or the instructions, when executed on the processor, cause the electronic device to perform:

determining a status value that corresponds to the state represented by the target status icon;

determining a target preset condition met by the status value; and displaying the at least one piece of prompt information that corresponds to the target preset condition.

9. The electronic device according to claim 6, wherein the program or the instructions, when executed on the processor, cause the electronic device to further perform:

receiving a third input; and updating a display state of the at least one status icon from a first state to a second state in response to the third input.

10. The electronic device according to claim 6, wherein the program or the instructions, when executed on the processor, cause the electronic device to further perform:

receiving a fourth input; and in response to the fourth input, displaying attribute information corresponding to each status icon in the at least one status icon at a position corresponding to the status icon, and updating a display state of a region outside the status bar from a third state to a fourth state, wherein the attribute information is used to describe a state represented by the status icon.

11. A non-transitory readable storage medium, wherein the non-transitory readable storage medium stores a program or instructions, and the program or the instructions, when executed on a processor of an electronic device, cause the electronic device to perform:

displaying an input box and a status bar, wherein the status bar comprises at least one status icon;

receiving a first input on a target status icon in the status bar; and in response to the first input, displaying target information in the input box or sending the target information, wherein the target information comprises prompt information that corresponds to a state represented by the target status icon; and the first input comprises an operation of long pressing the input box until a cursor is moved to the target status icon; wherein the target information comprises text prompt information and/or the target status icon, and the text prompt information is used to prompt the state represented by the target status icon, wherein the state is associated with an electronic device.

12. The non-transitory readable storage medium according to claim 11, wherein the program or the instructions, when executed on the processor, cause the electronic device to perform:

displaying at least one piece of prompt information that corresponds to the state represented by the target status icon;

receiving a second input for selecting target prompt information from the at least one piece of prompt information; and in response to the second input, displaying the target information in the input box or sending the target information, wherein the target information comprises the target prompt information.

13. The non-transitory readable storage medium according to claim 12, wherein the program or the instructions, when executed on the processor, cause the electronic device to perform:

determining a status value that corresponds to the state represented by the target status icon;

determining a target preset condition met by the status value; and displaying the at least one piece of prompt information that corresponds to the target preset condition.

14. The non-transitory readable storage medium according to claim 11, wherein the program or the instructions, when executed on the processor, cause the electronic device to further perform:

receiving a third input; and updating a display state of the at least one status icon from a first state to a second state in response to the third input.

15. The non-transitory readable storage medium according to claim 11, wherein the program or the instructions, when executed on the processor, cause the electronic device to further perform:

receiving a fourth input; and in response to the fourth input, displaying attribute information corresponding to each status icon in the at least one status icon at a position corresponding to the status icon, and updating a display state of a region outside the status bar from a third state to a fourth state, wherein the attribute information is used to describe a state represented by the status icon.

* * * * *